Patented Feb. 13, 1945

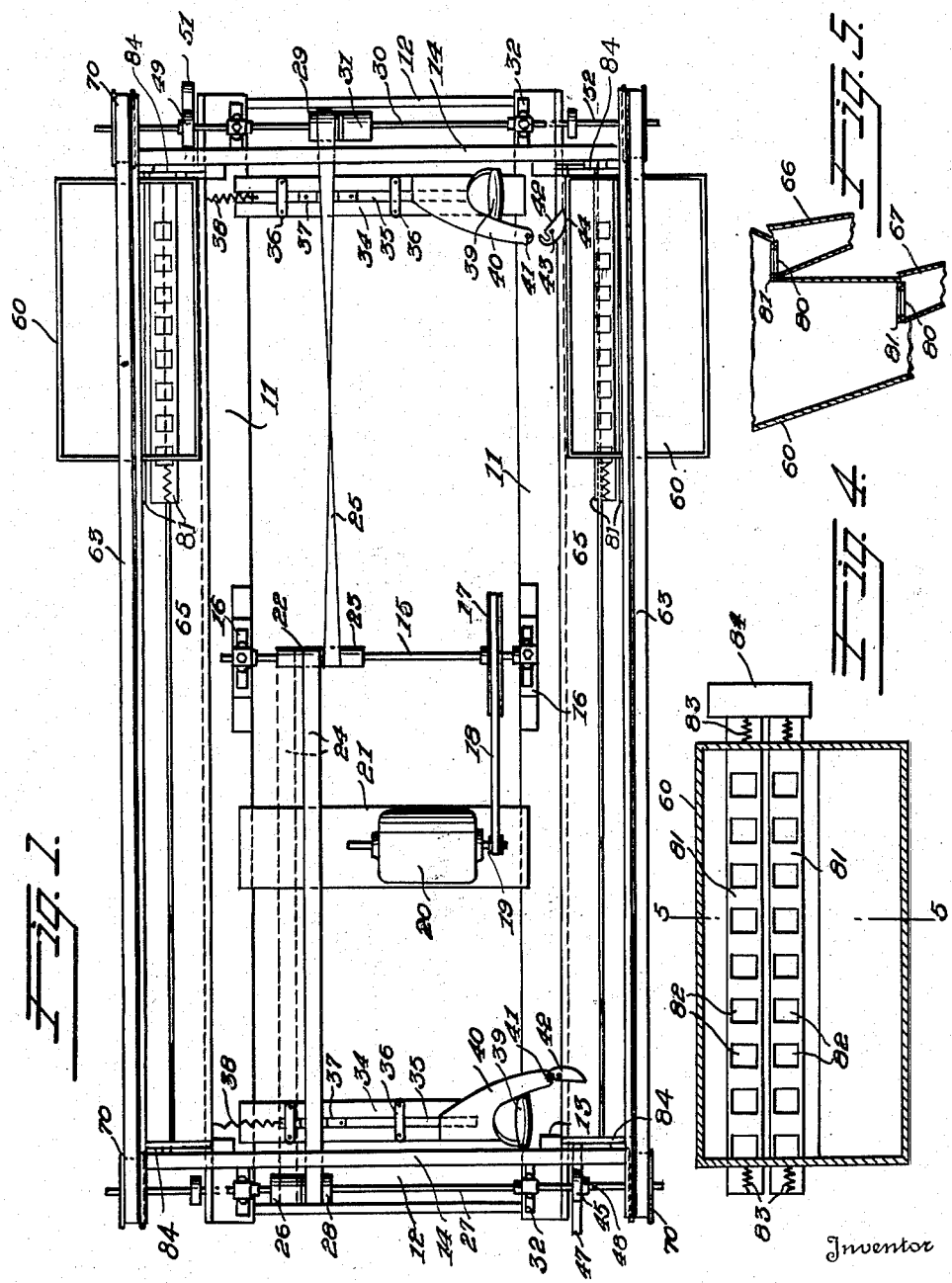

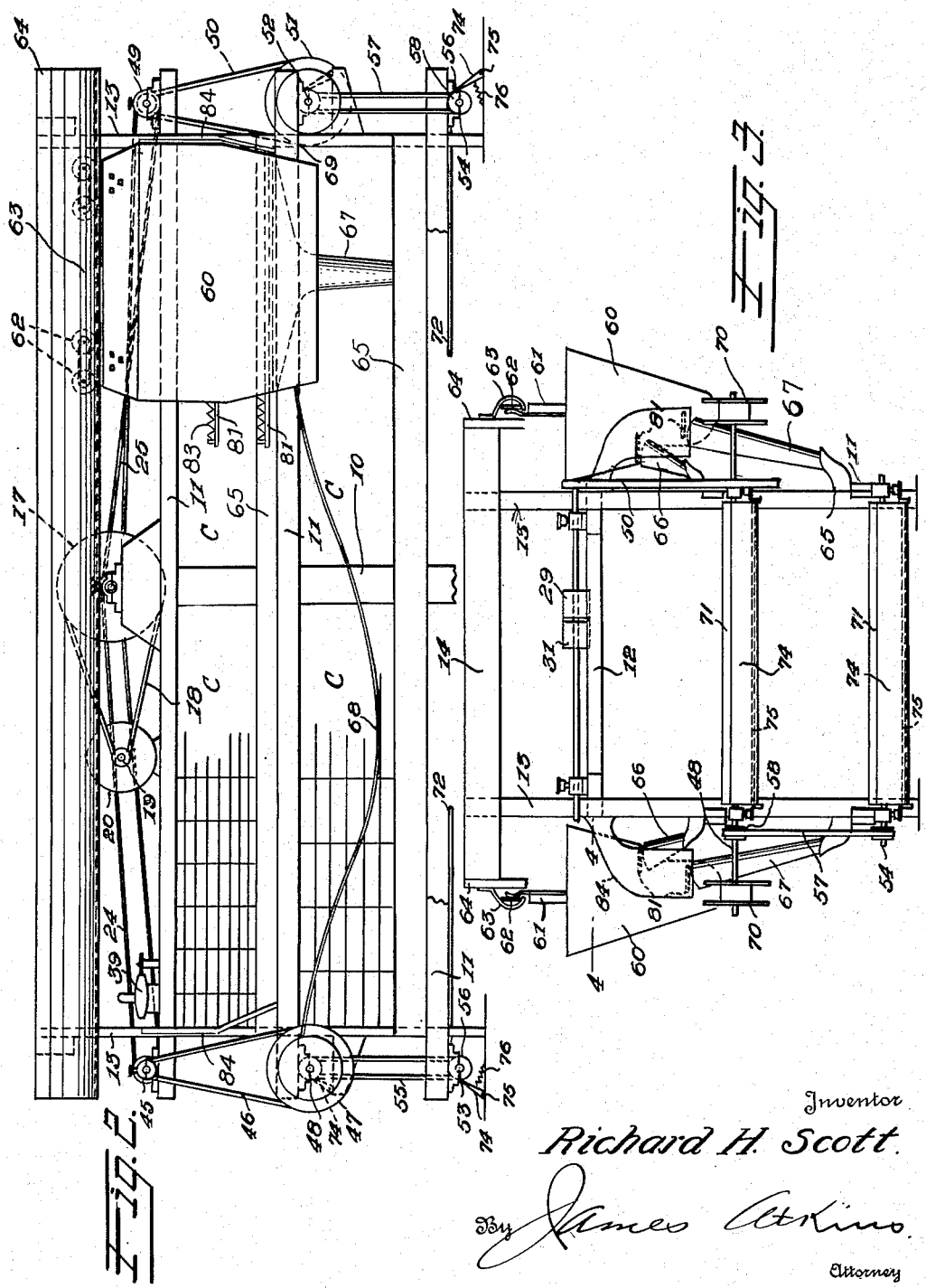

2,369,316

UNITED STATES PATENT OFFICE 2,369,316

CHICK DEVELOPING AND POULTRY CAGE

Richard H. Scott, Mansfield, N. Y.

Application January 12, 1942, Serial No. 426,506

6 Claims. (Cl. 119—17)

This invention relates to improvements in chick developing and poultry cages.

The invention is more particularly concerned with improved mechanism in operative association with chick developing and poultry cages for simultaneously and automatically cleaning same and delivering feed thereto.

It is well understood by persons engaged in handling poultry, and particularly in the developing of young chicks, that it is highly essential that the cages be repeatedly cleaned, that is, the droppings received and transported therefrom, in order to avoid many fatal diseases to which young chicks are readily subject.

It is further understood that it is necessary to supply feed to the cages several times each day for the proper growth and development of the chicks.

These operations have in the past usually been manually performed and thus required considerable time to carry them out, thereby adding materially to the labor cost of developing the chicks and, of course, correspondingly reducing the profit realized in the enterprise.

While it is appreciated that various structures have heretofore been proposed for automatically cleaning poultry cages and delivering feed thereto, nevertheless they were either of such complicated construction or failed to carry out the operations with such degree of satisfaction as to warrant their adoption as a replacement of the common manually performed operations.

A primary object of this invention is the provision of mechanism operatively associated with poultry cages for automatically supplying feed to and receiving and transporting droppings from the cages in a single operative cycle of the mechanism, thereby requiring a minimum of time on the part of the operator.

A further object of the invention is the provision of improved mechanism operatively associated with superposed batteries of poultry cages including means power driven from one end to the other of the batteries of cages and simultaneously supplying feed to and receiving and transporting droppings from the cages.

A still further object of the invention is the provision of mechanism of the above noted character which is relatively simple in construction, durable, and effective to carry out operations simultaneously, efficiently, and in a minimum interval of time.

For a more complete understanding of the nature and objects of the invention, reference will be had to the following detailed description, taken in connection with the accompanying drawings, wherein:

Figure 1 is a top plan view of the improved mechanism constructed in accordance with a preferred embodiment of the invention, the batteries of cages being omitted for greater clarity in disclosure.

Fig. 2 is a side elevational view of the structure of Fig. 1 with the superposed batteries of cages in operative position.

Fig. 3 is a right-hand end elevational view of the structure illustrated in Figs. 1 and 2 with the battery cages omitted for greater clarity in disclosure.

Fig. 4 is a horizontal section on line 4—4 of Fig. 3 and a portion of the frame, particularly showing the automatic control for the delivery of feed from the hopper into the delivery chutes.

Fig. 5 is a section on the line 5—5 of Fig. 4.

Referring now in detail to the drawings, the letter C designates superposed poultry cages or batteries of cages which are supported by and within a frame 10.

The frame may be of wood or metal and, while being capable of considerable modification, it preferably comprises three vertically spaced rectangular frame portions, each including longitudinal side rails 11, and opposite end rails 12. The three frame portions are held in parallel and vertically spaced relation by means of corner uprights 13 connected to the frame portions and interconnected at their upper ends by transverse bars 14.

A transverse shaft 15 is rotatably supported in bearings 16 disposed on the longitudinal rails 11 of the upper frame portion. A relatively large pulley 17 is fixed to shaft 15 adjacent one of the bearings 16 and is operatively engaged by a belt 18 which engages a smaller pulley 19 on the armature shaft of an electric motor 20 suitably supported on a base 21 having its opposite ends resting on the side rails 11.

A pair of relatively long pulleys 22 and 23 are secured for rotation with the shaft 15 adjacent the opposite bearing 16, the pulley 22 being engaged by a belt 24 and the pulley 23 being engaged by a belt 25.

The belt 24 is selectively engageable with a pulley 26 rotatable on a shaft 27 adjacent one end of the frame and a pulley 28 fixed for rotation with the shaft.

The belt 25 is selectively engageable with a pulley 29 rotatable on a shaft 30 at the opposite end of the frame and a pulley 31 fixed for rotation with the shaft. The shafts 27 and 30 are rotatably supported in suitable bearings 32 on the side rails 11 of the upper frame portion.

While the center shaft 15 will always rotate in the same direction, it is to be noted that belt 25 is crossed intermediate shafts 15 and 30 whereby shafts 27 and 30 will rotate in opposite directions upon engagement of the respective belts 24 and 25 with the fixed pulleys 28 and 31, respectively.

The belts 24 and 25 are normally urged into driving engagement with the respective free pulleys 26 and 29 by the following means.

A guide plate 34 is disposed transversely of the upper frame portion adjacent each end thereof and is suitably secured to the side rails 11. A slide 35 is retained in a slide-way of the guide plate by means of straps 36 secured to the guide plate. Each slide is provided with a belt-retaining and shifting yoke 37 and each slide is yieldably moved toward one end of the guide plate by means of a coil spring 38 having one end thereof connected to the slide and the other end thereof connected to the frame, thereby normally moving the constantly driven belts 24 and 25 into engagement with the free or non-shaft rotating pulleys 26 and 29.

Each slide 35 is provided with a suitable handle 39 for moving same in opposition to the effort of the spring and each slide is further provided with a lug 40 having a pin 41 in the free end thereof for engagement by a latch 42 when the slide is moved to bring the respective belt 24 or 25 into driving relation with the shaft-fixed pulley 28 or 31.

The latches 42 are pivoted to the frame at 43 and have projecting cam ends 44 for a purpose later described.

The shaft 27 at one side of the frame portion is provided with a relatively small pulley 45 which is operatively connected by means of a belt 46 to a relatively large pulley 47 fixed to a shaft 48 directly beneath shaft 27 and which is rotatably supported in suitable bearings on the lower faces of the side rails 11 of the intermediate frame portion.

The shaft 30 is likewise provided with a relatively small pulley 49 at the opposite side of the frame and which is operatively connected by means of a belt 50 to a relatively large pulley 51 fixed to a shaft 52 directly beneath the shaft 30 and which is rotatably supported in suitable bearings on the lower faces of the side rails 11 of the intermediate frame portion.

With this construction it will be noted that shafts 48 and 52 are driven at a substantially reduced speed to that of the respective shafts 27 and 30.

The lower frame portion also is provided with shafts 53 and 54 which are rotatably supported in suitable bearings secured to the lower faces of the side rails 11 of the lower frame portion and being disposed below and in substantially vertical alinement with the respective shafts 27, 48 and 30, 52.

The shafts 48 and 53 are operatively connected for uni-speed rotation by a belt 55 engageable with pulleys 56 on the shafts and the shafts 52, 54 are likewise operatively connected for uni-speed rotation by a belt 57 engageable with pulleys 58 on the shafts.

From the above description it will be observed that shafts 48 and 52 are disposed immediately below the bottoms of the upper cage or cages and that shafts 53, 54 are disposed immediately below the bottoms of the lower cage or cages. Furthermore, it is to be noted that shafts 48 and 53 rotate in the same direction as shaft 27, and that shafts 52 and 54 rotate oppositely or in the direction of rotation of shaft 30.

A feed hopper 60 is disposed at each side of the frame 10 with the hoppers always in transverse alinement. Each hopper is provided with a median flange 61 to which are secured pairs of rollers 62 engageable within a track 63 secured to a longitudinal bar 64 which in turn is secured to the frame bars 14.

The hoppers are jointly movable alternately from one end of the frame or cages to the other for delivering feed into longitudinal troughs 65 secured to the frame adjacent the opposite sides of the cages. The hoppers are provided with chutes 66, 67, the former cooperating with the upper troughs and the latter cooperating with the lower troughs.

The hoppers 60 are each moved longitudinally of the frame by means of bands 68 and 69, adjacent ends of which are secured to opposite ends of the hopper and the other ends of which are secured to pulleys 70 on opposite ends of the shafts 48 and 52, the bands alternately rolling on and unrolling from the pulleys on each shaft in correspondence with movement of the hoppers from end to end of the frame.

The shafts 48, 52 and 53, 54 each support a transverse drum 71 about which pass endless belts or to which are secured the opposite ends of a band 72 for alternate winding upon and unwinding from the opposed drums below each cage upon alternate rotation of the shafts in opposite directions. The bands 72 (or endless belts, if desired) are of a width at least equal to that of the cages and are disposed immediately below the wire mesh bottoms thereof to collect droppings from the cages.

A laterally disposed scraper 74 is pivotally supported at 75 adjacent one edge thereof and has the free edge thereof yieldably retained in engagement with the band or belt by means of springs 76 for removing droppings from the band or belt upon travel thereof in either direction as occasioned by rotation of the shafts 48, 53 or 52, 54 at opposite ends of the frame.

Due to the fact that the hoppers 60 travel a less distance than the droppings-collecting bands or belts there is sufficient slackness in the bands 68 and 69 to overcome such difference in distance of travel.

The hoppers 60 are shown in Figs. 1 and 2 at one end of travel thereof, and in order to control the flow of feed from the hoppers to the troughs 65 to prevent flow of feed when the hoppers are at rest at one end or the other of the frame and permit flow of the feed upon initiation of movement of the hoppers, suitable valve means are provided and are shown in detail in Figs. 4 and 5.

Each hopper is provided with a longitudinal row of spaced apertures 80 immediately above each chute 66, 67 and a like apertured slide bar 81 is disposed immediately above the apertures 80 with the apertures 82 in the slide bar normally alined with the apertures 80 by means of counterbalancing springs 83 adjacent opposite ends of each slide bar and with one end of each spring connected with the bar and the other end connected with the hopper.

A lug 84 projects from the frame adjacent each corner thereof and each lug is positioned in the path of movement of the adjacent ends of the respective slide bars 81.

The slide bars 81 normally project outward of the hopper a distance equal to the spacing between the apertures or the width of the apertures whereby the apertures 80, 82 will be misalined upon movement of the hoppers into engagement with either end pair of lugs 84, with the result that the flow of feed into the chutes will be instantly checked upon the hoppers reaching the limit of their movement toward one end or the other of the frame or cages.

Having described the improved construction in detail, the operation thereof is as follows:

Considering Figs. 1 and 2, the hoppers 60 are at the right hand end of the frame with the drive belt 25 running on the idler pulley 29 and belt 24 has been engaged with the drive pulley 28 by pulling the slide 35 forwardly and interlocking the latch 42 with pin 41. Shafts 27, 48 and 53 will accordingly be positively rotated counter-clockwise, and the bands or belts 72 will be moved to the left, whereupon the scrapers 74 will remove the droppings for falling into a suitable receptacle while clean surfaces of the bands or belts will be positioned beneath the batteries of the superposed cages C.

Simultaneously with this cleaning action the hoppers 60 will be pulled by bands 68 to the left end of the frame and feed will be automatically delivered to the troughs 65 adjacent the opposite sides of the cages C.

Upon reaching the left end of the frame, one of the hoppers will engage the cam end 44 of the corresponding latch 42 and swing it out of locking engagement with pin 41, as indicated at the right of Fig. 1, whereby belt 24 will be moved into driving engagement with loose pulley 26 with a resulting arrest of the rotation of shafts 27, 48 and 53. At the same time, the leading ends of slide bars 81 will engage lug 84 with a resulting misalignment of the apertures 80, 82 and checking of the flow of feed into the chutes 66 and 67.

For the succeeding feeding and cleaning operation, the right hand slide 35 will be drawn forwardly by handle 39 and latch 42 engaged with pin 41 for holding belt 25 in driving engagement with the pulley 31 to initiate rotation of shafts 30, 52 and 54 in clockwise direction, whereupon slide bars 81 will move to neutral position upon movement of the hoppers away from lugs 84 with a consequent alinement of feed apertures 80, 82, and the hoppers will be moved to the right hand end of the frame, distributing feed into the troughs 65, and upon reaching the right hand end of the corresponding latch 42 will be tripped and belt 25 shifted to the idler pulley 29. At the same time, the adjoining ends of bars 81 will engage the corresponding lugs 84 and arrest the flow of feed into the chutes 66, 67. Furthermore, the bands or belts 72 will be moved to position clean surfaces beneath the cages with the scrapers 74 at the right hand end removing the droppings from the surfaces previously disposed beneath the cages. The motor 20 is, of course, provided with a conveniently accessible switch for turning same on and off.

While I have shown but two layers of cages it is apparent that three or more may be used, in which instance additional shafts corresponding to shafts 47, 53, 52, 54 would be provided and the hoppers 60 provided with additional feed chutes. Furthermore, the structure is not limited in the length of the cages or batteries thereof and may be of any dimensions desired.

While I have disclosed but a single specific embodiment of my invention, such is to be considered as illustrative only and not restrictive, the scope of the invention being defined in the subjoined claims.

What I claim and desire to secure by U. S. Letters Patent is:

1. Apparatus for automatically and simultaneously delivering feed to a poultry cage and receiving droppings therefrom, comprising a frame receiving a cage therewithin, a feed trough extending lengthwise of the frame at one side thereof, a feed hopper for delivering feed to the trough and supported for alternate movement from one end of the frame to the other, a droppings collecting band supported beneath the cage for successive movement in directions towards opposite ends of the frame to expose a different surface area in each movement thereof, means for removing droppings from the band upon movement thereof, and power-actuated means for simultaneously moving the hopper and band lengthwise of the frame.

2. Apparatus for automatically and simultaneously delivering feed to a poultry cage and receiving droppings therefrom, comprising a frame receiving a poultry cage therewithin, a feed-receiving trough supported by and extending longitudinally of each side of the frame, a feed-delivering hopper supported by the frame at each side thereof for movements lengthwise of the frame and alternately towards opposite ends thereof for admitting feed to the troughs, a droppings collecting band substantially of the width of the cage supported beneath same and having its opposite ends connected to rotatable drums for movement of the band alternately toward opposite ends of the frame to present successive surface areas thereof beneath the cage, means for removing droppings from the band upon each alternate movement thereof, and power-actuated means for simultaneously moving the hoppers and band longitudinally of the frame.

3. Apparatus according to claim 2, together with automatically operable means cooperable with the hoppers and frame for suspending delivery of feed from the hoppers into the troughs at the limit of travel of the hoppers towards opposite ends of the frame.

4. Apparatus for automatically and simultaneously delivering feed to poultry cages and removing droppings therefrom, comprising a frame enclosing cages, a feed receiving trough supported by said frame longitudinally of each side thereof, a feed delivery hopper supported by the frame at each side thereof, for movement lengthwise of the troughs and alternately towards opposite ends thereof, a droppings collecting band substantially of the width of the cages supported beneath same and having its opposite ends connected to rotatable drums journalled in the opposite ends of the frame, the drums being alternately movable in different directions to present successive surface areas of the band beneath the cages, a pivoted scraper yieldably urged toward each drum and engaging the band upon rotation of the drums to remove droppings from the band, and power actuated means for simultaneously moving the hoppers and band longitudinally of the frame.

5. Apparatus according to claim 4, wherein said power actuated means comprises a shaft at each end of the frame, a motor driven uni-directional shaft intermediate said first shafts, belt and clutch means between said last shaft and said first shafts for alternately rotating said first shafts in opposite directions, means connected with said first shafts for moving said hoppers, and said drums being rotated by said first shafts.

6. Apparatus according to claim 4, together with a second droppings collecting band beneath the first band and other cages therebetween and having its ends secured to drums operatively connected with the first drums for rotation therewith.

RICHARD H. SCOTT.